United States Patent [19]
Young

[11] Patent Number: 4,749,858
[45] Date of Patent: Jun. 7, 1988

[54] NUCLEAR MEASURING GAUGE WITH AUTOMATIC DETECTION OF SOURCE DEPTH

[75] Inventor: James E. Young, Youngsville, N.C.

[73] Assignee: Troxler Electronic Laboratories, Inc., Research Triangle Park, N.C.

[21] Appl. No.: 900,981

[22] Filed: Aug. 27, 1986

[51] Int. Cl.⁴ .......................... G21G 4/06; G01V 5/00
[52] U.S. Cl. .................................. 250/253; 250/308; 33/172 E
[58] Field of Search .................... 250/253, 308, 497.1, 250/493.1; 324/65 R, 63; 33/172 E, 147 N; 73/314

[56] References Cited

U.S. PATENT DOCUMENTS

| | | | |
|---|---|---|---|
| 2,150,006 | 3/1939 | Parker et al. | 324/63 |
| 3,544,793 | 12/1970 | Bless et al. | 250/253 |
| 4,146,796 | 3/1979 | Campbell | 250/493 |
| 4,637,254 | 1/1987 | Dyben et al. | 73/314 |

Primary Examiner—Janice A. Howell
Assistant Examiner—Constantine Hannaher
Attorney, Agent, or Firm—Bell, Seltzer, Park & Gibson

[57] ABSTRACT

The present invention provides an apparatus for detecting the depth position of the source rod of a portable nuclear measuring gauge having a housing with the elongate source rod extending vertically therethrough and mounted for vertical sliding movement to various depth positions. The apparatus comprises an elongate variable resistance element extending axially parallel to said source rod, means for slideably engaging the elongate variable resistance element as the source rod is moved to various depth positions so as to vary the resistance of said variable resistance element, and means electrically connected to said variable resistance element for sensing the changes in resistance thereof and converting such changes into an indication of the depth position of the source rod.

7 Claims, 1 Drawing Sheet

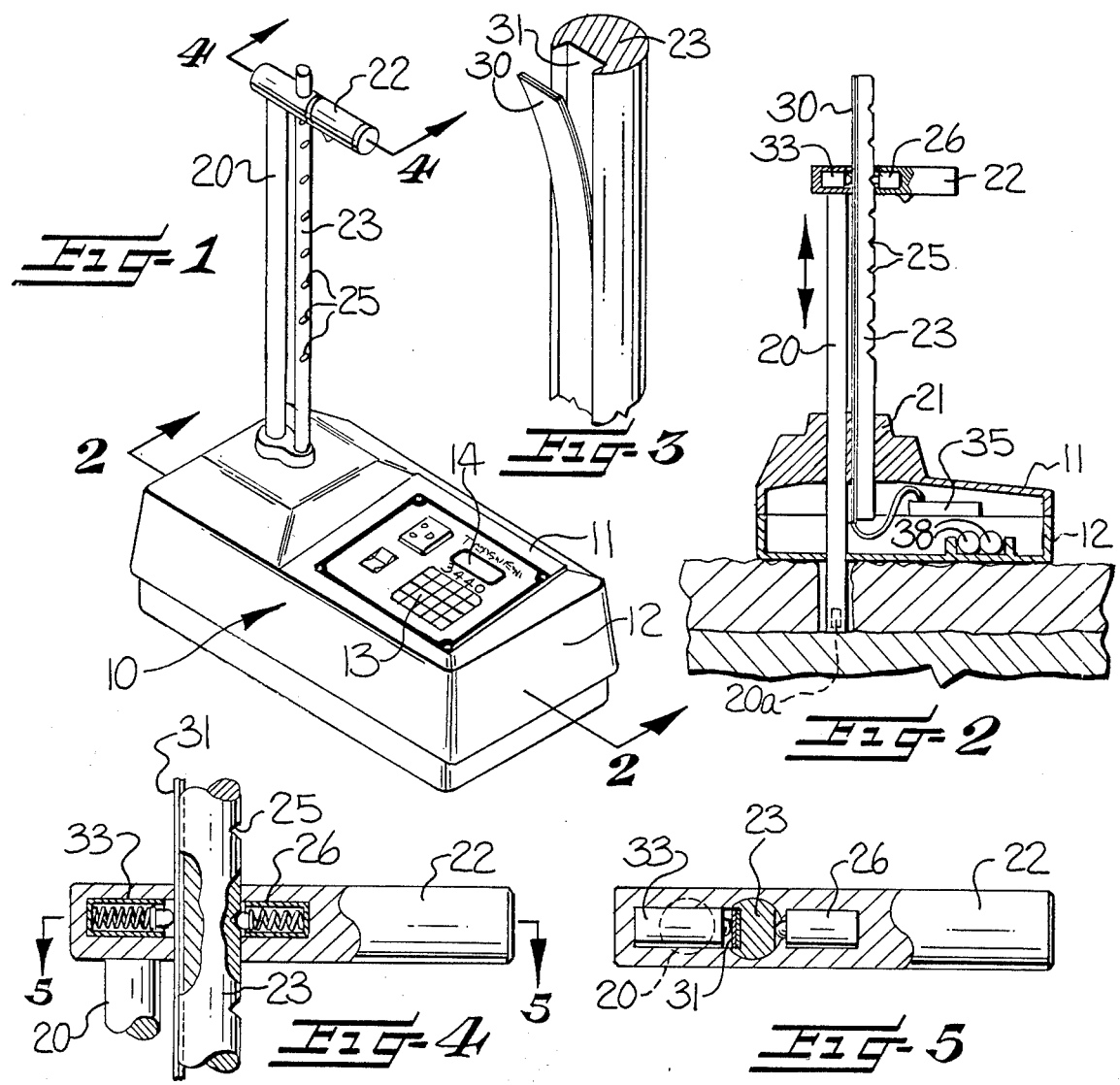
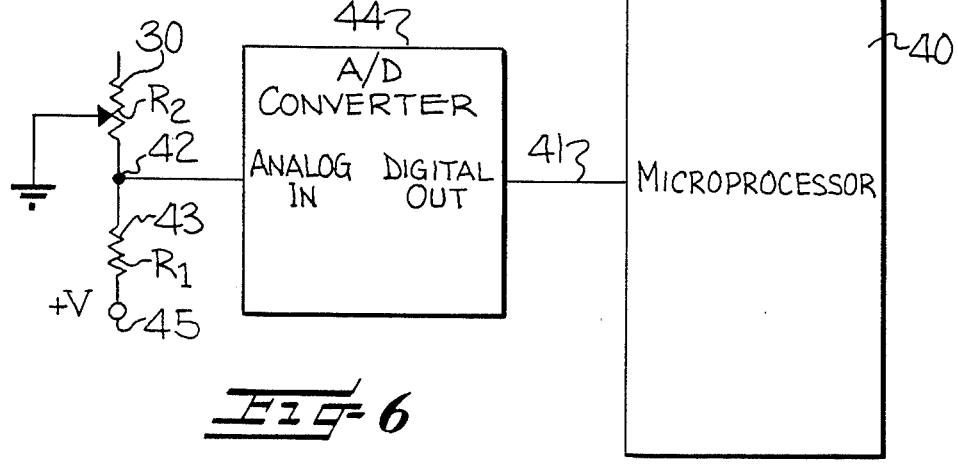

NUCLEAR MEASURING GAUGE WITH AUTOMATIC DETECTION OF SOURCE DEPTH

BACKGROUND OF THE INVENTION

This invention relates generally to an improvement in a portable nuclear measuring gauge for measuring the physical characteristics, such as density and moisture, of a test material. This type of gauge is commonly used for measuring moisture and density in test materials such as soils and pavement.

Commercially available gauges of this type have a housing with a vertically adjustable source rod extending therethrough. The lower end of the source rod contains a source of gamma and/or neutron radiation and radiation detectors are located within the housing. The gauge is designed to be operated in either a backscatter mode of measurement or a direct transmission mode. In the backscatter mode, the source rod is in a retracted position generally flush with the lower surface of the housing and radiation is directed from the source downwardly into the underlying test material. Radiation from the source which is backscattered by the underlying test material is detected at the detectors. When operated in the direct transmission mode of measurement, a hole is formed in the test material and the source rod is moved to a downwardly extended position within the hole. Radiation which passes from the source directly through the test material is detected by the detector and the measurement reading is obtained. In order that the proper calibration parameters are used by the gauge during the calculations which determine the measurement reading, it is necessary to know the depth position of the radiation source in the test material. One well known commercial model of gauge (e.g., Troxler Electronic Laboratories 3400-B Series Surface Moisture-Density Gauge) employs a switch which is manually set by the operator to the same value as the depth of the source rod.

Nuclear gauges have also been proposed in which the depth position of the source rod is automatically determined, as is shown for example in U.S. Pat. No. 4,146,796. In the arrangement shown in this patent a series of switches is provided along the length of the source rod and the switches are selectively actuated as the source rod is moved into different preselected depth positions.

SUMMARY OF THE INVENTION

The present invention provides an arrangement by which the depth position of the source rod of a portable nuclear measuring gauge is automatically detected, and which has a number of significant advantages over the arrangement shown in the aforementioned prior patent. In accordance with the present invention an elongate variable resistance element is provided extending axially parallel to the source rod, and means is mounted for slideably engaging the elongate variable resistance element as the source rod is moved to various depth positions so as to thereby vary the resistance of the variable resistance element. Means is electrically connected to the variable resistance element for sensing the changes in the resistance thereof and for converting such changes into an indication of the depth position of the source rod. The elongate variable resistance element is quite reliable, and is immune to adverse environmental influences such as dirt and moisture. It is quite simple to install and can be easily field serviced. Furthermore, the resistance element can be used at all incremental depths and does not require a large number of connections and leads, as would be required when using a plurality of discrete switches.

BRIEF DESCRIPTION OF THE DRAWINGS

Some of the features and advantages of the invention having been stated, others will become apparent as the description proceeds, when taken in connection with the accompanying drawings, in which FIG. 1 is a perspective view of a portable nuclear measuring gauge embodying the present invention;

FIG. 2 is a vertical sectional view thereof taken substantially along the line 2—2 of FIG. 1 and wherein the source rod has been moved downwardly into position for a direct transmission measurement;

FIG. 3 is a partially exploded fragmentary view showing the guide rod and the variable resistance element therein;

FIG. 4 is a fragmentary detailed sectional view taken substantially along the line 4—4 of FIG. 1;

FIG. 5 is a sectional view taken substantially along the line 5—5 of FIG. 4; and FIG. 6 is a schematic wiring diagram.

DESCRIPTION OF ILLUSTRATED EMBODIMENT

Referring now more particularly to the drawings, the gauge illustrated includes a housing, generally indicated at 10 including an upper section 11 and a lower section 12 formed of a suitable lightweight material, such as cast aluminum. The lower section 12 has a relatively flat bottom surface so that the gauge can be positioned directly upon the test material which is to be measured. On the upper side of the housing a keyboard 13 is provided by which an operator can control the various functions of the gauge and a display 14, such as a liquid crystal display, is provided for communicating measurement readings and other information to the operator.

A source rod 20 extends vertically through the housing 10 and upwardly from a supporting column 21 on the upper side of the housing. A radioactive source 20a (FIG. 2) is mounted in the lower end of the source rod 20, and detector tubes 38 are located within the housing. The source rod 20 is mounted for vertical sliding movement between an upwardly retracted position as illustrated in FIG. 1 and a lowered position, such as is illustrated in FIG. 2, in which the lower end of the rod protrudes downwardly below the lower surface of the housing for use in direct transmission measurements. A handle 22 is mounted at the upper end of the source rod 20 to facilitate carrying the gauge and for positioning the source rod 20 at various preselected depth positions.

A guide rod 23 is fixedly mounted to the housing and extends upwardly therefrom alongside the source rod 20. As illustrated, the guide rod passes through an opening formed in the handle 22 and thereby serves to support and stabilize the upper end of the source rod 20. A series of spaced apart index formations or detents 25 are formed in the guide rod 23 at spaced locations along the length thereof, and spring loaded plunger 26 mounted in the handle 22 engages the detent formations 25 for retaining the handle 22 and the associated source rod 20 at any of a plurality of preselected depth positions as defined by the detent formations. By way of example, the detents 25 may be spaced an inch apart to permit positioning the rod at one inch intervals at any of a series of preselected depth positions ranging from fully retracted (shielded position) to twelve inches deep.

To enable the instrument to automatically detect the position of the source rod at any of the preselected depth positions, an elongate sealed flexible variable resistance element 30 is mounted extending axially alongside the source rod 20 throughout substantially its entire length. Movement of the source rod to different depths varies the resistance of the variable resistance element 30 so that the depth position may be detected. As best seen in FIG. 3 the resistance element 30 is in the form of a narrow strip and is mounted in a recess 31 formed in the guide rod. Referring to FIG. 4, a spring loaded plunger 33 is mounted within the handle 22 and bears against the variable resistance element 30. When the position of the source rod is changed, the plunger slideably engages the variable resistance element 30 and produces a change in its resistance characteristics. The variable resistance element is a commercially available item and operates somewhat similar to the well known and commercially available pressure sensitive membrane switches. However, in this instance, applying pressure at any location along the length of the strip will alter the resistance characteristics of the element. The free end of the variable resistance element 30 is electrically connected to a circuit board 35 which contains the various electronic components required for the operation of the gauge.

FIG. 6 illustrates more fully how the variable resistance element 30 is connected to the operating components of the gauge so as to provide an indication of the depth position of the source rod. A microprocessor, indicated at 40, contains a stored set of instructions which are employed by the gauge for carrying out the various calculations required to perform its measurement functions. The specific calculations required to obtain density and moisture measurements in nuclear gauges of this general type are well known in the art, and gauges equipped with microprocessors programmed with a stored set of instructions for carrying out these calculations are commercially available. One such gauge is the Troxler 3400-B Series Surface Moisture-Density Gauge.

In the present invention the same microprocessor which is employed for carrying out the measurement functions is also used to determine the depth position of the source rod and to select the appropriate calibration parameters for that depth for use in the calculations. As illustrated, the microprocessor 40 receives a digital signal as indicated at 41 which is proportional to the depth setting of the source rod. As seen more clearly in FIG. 6, the variable resistance element 30 is connected to ground and to a constant voltage supply 45 through a voltage dropping resistor 43 of suitable magnitude. The voltage at point 42 will vary depending upon the resistance of the variable resistance element 30. The voltage at point 42 is converted by an analog to digital converter 44 into a binary output digital signal at the output 41. This digital signal is received as an input by the microprocessor and, in turn, is employed by the microprocessor in determining the particular depth position of the source rod. This may be accomplished quite simply, for example, by comparing the value of the digital signal at output 41 with stored reference values obtained through a calibration procedure in which the value at the output 41 is initially measured for each of the depth positions. Once the depth setting of the source rod is detected, the appropriate parameters for that depth setting are selected and employed in the density calculations performed in the microprocessor.

That which I claim is:

1. Apparatus for detecting the depth position of the source rod of a portable nuclear measuring gauge having a housing with the elongate source rod extending vertically therethrough and mounted for vertical sliding movement to various depth positions, said apparatus comprising an elongate sealed flexible variable resistance membrane element extending axially parallel to said source rod, means for slideably engaging the elongate variable resistance membrane element as the source rod is moved to various depth positions so as to vary the resistance of said variable resistance element, and means electrically connected to said variable resistance membrane element for sensing the changes in resistance thereof and converting such changes into an indication of the depth position of the source rod.

2. Apparatus according to claim 1 wherein said means for slideably engaging the elongate variable resistance element comprises a spring loaded plunger mounted for applying pressure against said variable resistance element.

3. Apparatus according to claim 1 wherein said means for sensing changes in resistance and for converting such changes into an indication of the depth position of the source rod comprises
    an analog-to-digital converter electrically connected to said variable resistance for receiving a voltage signal which varies in proportion to variations in the resistance of said element and for producing a digital output signal having a value proportional to said voltage signal, and
    microprocessor mean connected for receiving said digital output signal and including means for converting such digital output signal into an indication of the depth position of the source rod.

4. Apparatus according to claim 1 wherein the portable nuclear measuring gauge includes a guide rod fixedly carried by the housing and extending substantially parallel to said source rod and cooperating therewith for supporting the upper end of the source rod, and wherein said elongate variable resistance element extends axially along said guide rod and is secured thereto.

5. A portable nuclear measuring gauge comprising
    a housing having a relatively flat bottom wall adapted to be positioned upon a test material,
    an elongate source rod extending through said housing and mounted for slideable vertical movement relative thereto for positioning the lower end of the source rod in extending relation beyond the lower wall of the housing for penetrating into the test material at various selected depth positions,
    a radioactive source carried by the lower end of said source rod,
    a guide rod fixedly carried by said housing and extending vertically, substantially parallel to said source rod for guiding and supporting said source rod,
    an elongate sealed flexible variable resistance membrane element extending axially along said guide rod and secured thereto,
    means for slideably engaging said elongate variable resistance membrane element upon vertical adjusting movement of said source rod so as to continuously vary the electrical resistance of said variable resistance membrane element in response to said adjusting movement, and means electrically connected to said variable resistance membrane element for sensing the changes in resistance thereof and for determining therefrom the depth position of said source rod.

6. Apparatus according to claim 5 wherein said means for sensing changes in resistance and for converting such changes into an indication of the depth position of the source rod comprises an analog-to-digital converter electrically connected to said variable resistance for receiving a voltage signal which varies in proportion to variations in the resistance of said element and for producing a digital output signal having a value proportional to said voltage signal, and microprocessor means connected for receiving said digital output signal and including means for converting such digital output signal into an indication of the depth position of the source rod.

7. A portable nuclear measuring gauge comprising a housing having a relatively flat bottom wall adapted to be positioned upon a test material, an elongate source rod extending through said housing and mounted for slideable vertical movement relative thereto for positioning the lower end of the source rod in extending relation beyond the lower wall of the housing for penetrating into the test material at various selected depth positons, a radioactive source carried by the lower end of said source rod, a handle extending laterally from and secured to the upper end of said source rod, a guide rod fixedly carried by said housing and extending vertically, substantially parallel to said source rod and cooperating with said handle means for guiding and supporting the upper end of said source rod, a series of spaced detents formed in said guide rod and adapted to be selectively and releasably engaged by said handle means for retaining the source rod at preselected depth positions, an elongate sealed flexible variable resistance membrane element extending axially along said guide rod and secured thereto, means carried by said handle means for slideably engaging said elongate variable resistance membrane element upon vertical adjusting movement of said source rod so as to continuously vary the electrical resistance of said variable resistance membrane element in response to said adjusting movement, and means electrically connected to said variable resistance membrane element for sensing the changes in resistance thereof and for determining therefrom the depth position of said source rod.

* * * * *

UNITED STATES PATENT AND TRADEMARK OFFICE
CERTIFICATE OF CORRECTION

PATENT NO. : 4,749,858

DATED : June 7, 1988

INVENTOR(S) : James E. Young

It is certified that error appears in the above-identified patent and that said Letters Patent is hereby corrected as shown below:

Column 4, line 35, "mean" should be -- means --.

Column 6, line 2, "positons" should be -- positions --.

Signed and Sealed this

Fifteenth Day of November, 1988

Attest:

DONALD J. QUIGG

Attesting Officer

Commissioner of Patents and Trademarks